United States Patent Office 2,869,925
Patented Jan. 20, 1959

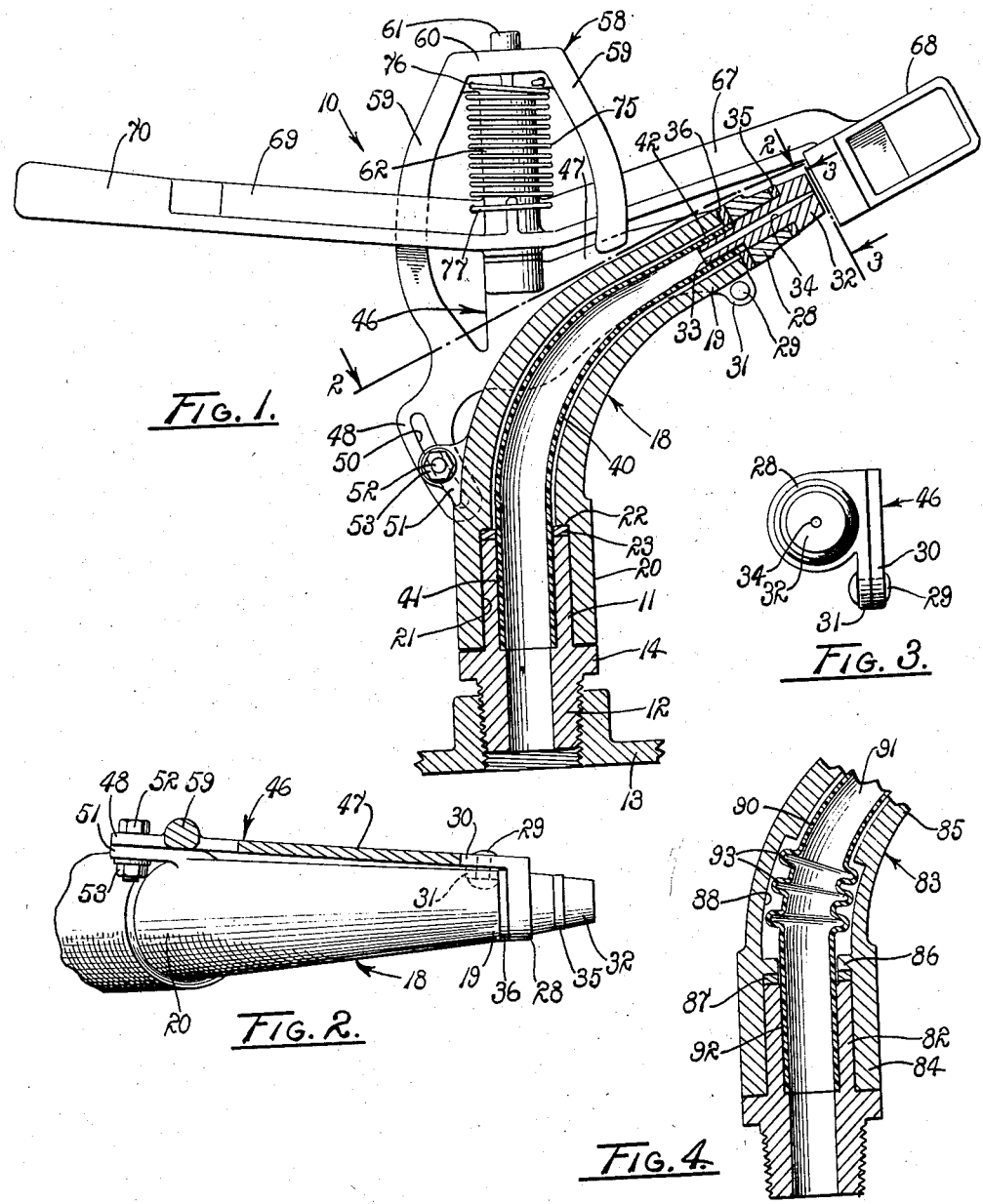

2,869,925

SPRINKLER HEAD

Howard M. Crow, Lindsay, Calif.

Application March 19, 1956, Serial No. 572,477

9 Claims. (Cl. 299—64)

Whether impact motivated, driven by water jet reaction, or otherwise caused to rotate, rotary sprinklers have generally been characterized by excessive leakage. They uniformly employ a hollow base member connected to a suitable conduit, a cap nut of one structure or another mounted on the base member, a hollow sprinkler spindle rotatably mounted in the cap nut, and packing between the spindle and the cap nut. The spindles are usually upwardly extended from the base member and provide laterally directed nozzles. Various means for rotating the spindles and the nozzles are employed but in all instances the driving force is limited. Thus, the packing between the cap nut and the spindle can not always be held in fluid tight engagement with the spindle or the resultant friction precludes satisfactory rotation. When the packing is sufficiently loose to accommodate free rotation, leakage almost always occurs. The problems of leakage are of course aggravated by wear. Constant rotation or oscillation of the spindles soon wears any initially suitable packing to the point where readjustment or repacking is required or leakage must be tolerated.

Accordingly, it is an object of the present invention to minimize leakage in rotary sprinklers.

Another object is to provide a rotary sprinkler in which the need for packing, gaskets, and the like, is obviated.

Another object is to minimize wear as a result of relatively moving parts in a rotary sprinkler.

Another object is to provide a rotary sprinkler having an elevationally adjustable fluid distributing trajectory.

Other objects are to provide a sprinkler having improved water tight integrity and operational characteristics which is simple to make, economical to use, durable in form, dependable in use, and which is highly satisfactory for its intended functions.

These and other objects will be more fully apparent upon reference to the following description.

In the drawing:

Fig. 1 is a side elevation partially in section of a sprinkler incorporating the principles of the present invention.

Fig. 2 is a fragmentary section taken on line 2—2 of Fig. 1.

Fig. 3 is an end view from a position indicated by line 3—3 of Fig. 1.

Fig. 4 is a fragmentary elevational section of another form of the present invention.

Referring with greater particularity to the drawing, a sprinkler 10 incorporating the principles of the present invention is shown in Fig. 1. The sprinkler provides a substantially cylindrical coupling sleeve 11 having a screw-threaded male end 12 adapted to be threaded into a fluid supply conduit 13, so as to support the sleeve in an upstanding position. The sleeve has an annular flange 14 disposed in a substantially horizontal position when the sleeve is upwardly extended.

An arcuate tubular body 18 is provided and includes an upper end portion 19 and a lower end portion 20. The lower end portion of the body has a substantially cylindrical female bearing socket 21 rotatably journalled on the coupling sleeve 11 above the flange 13. The body has an internal shoulder 22 in the bearing socket, and a washer 23 is preferably interposed the shoulder and the coupling sleeve endwardly of the sleeve. The body is thus upwardly outwardly extended from the coupling sleeve and is adapted for rotation around a substantially erect axis coaxially of the coupling sleeve.

The body 18 has a substantially cylindrical nozzle mounting member 28 at the upper end portion 19 thereof which is pivotally mounted by means of a pin 29 extended through an ear 30 on the mounting member and an ear 31 on the upper end portion of the body. A jet nozzle 32 has a boss or nipple 33 rotatably fitted in the nozzle mounting member and an opening 34 through which fluid is discharged axially of the nozzle. Washers 35 and 36 are preferably interposed the mounting member and the upper end portion of the body and the mounting member and the nozzle.

An elongated, resiliently flexible, fluid conducting tube 40 provides a lower end 41 secured, as by vulcanization or other suitable bonding means, within the coupling sleeve 11 and an upper end 42 likewise secured to the boss 33 of the nozzle 32. The tube is connected in fluid-tight relation to the sleeve and to the nozzle and is adapted to conduct fluid from the sleeve to the nozzle while permitting rotation of the body 18 relative to the coupling sleeve. In this regard it is to be noted that the nozzle rotates relative to the nozzle mounting member 28 during rotation of the body, as will be evident.

A support bracket 46 has a plate 47 integrally connected to, and extended from, the nozzle mounting member 28, as best seen in Fig. 2, providing a flange 48 having an arcuate slot 50 therein. An ear 51 extends from the body 18 adjacent to the flange 48, and a stud 52 is extended through the ear 51 and the slot 50. An adjustment nut 53 is screw-threadedly connected to the stud for securing the flange and thus the support bracket in selected elevationally adjusted positions of the body 18. It is to be noted that the support bracket is elevationally pivotally adjustable around the pin 29 constituting a horizontal pivot axis and is provided for the purpose of adjusting the angle of inclination of the nozzle 32. In this manner the trajectory of discharge of the nozzle may be varied. It will be understood that the nut 53 secures the bracket to fix the angle of inclination of the nozzle in desired positions.

An arch member 58 is rigidly upwardly extended from the bracket 46 and includes a pair of upstanding legs 59 interconnected by a top portion 60. A journal post 61 is extended between the top portion of the arch member and the support bracket between the legs of the arch member, and a collar 62 is journalled on the post.

A deflecting arm 67 is rigidly outwardly extended from the collar on one side of a leg 60 of the arch member 58 and mounts a fluid deflecting member 68 in fluid interception position in front of the nozzle 32. A counterweight arm 69 is extended outwardly from the collar 62 in the opposite direction from the deflecting arm 67 and on the opposite side of the other leg 60 of the arch member from the deflecting arm. The arm 69 mounts a counterweight 70 preferably integrally thereon. The deflecting member is thus mounted for oscillating movement on the support bracket between its fluid intercepting position in front of the nozzle and a position displaced therefrom.

A torsion spring 75 is wound around the collar 62 and has an upper end 76 connected to the top portion 59 of the arch member 58 and a lower end 77 connected to the arms 67 and 69. The spring normally urges the deflecting member 68 into fluid intercepting position but is yieldable to permit said oscillating movement.

Second form

Another form of the present invention is shown in Fig. 4 and, as before provides a coupling sleeve 82 in all respects like sleeve 11. A body 83 is employed having a construction similar to the body 18 and thus having a lower end 84 rotatably journalled on the sleeve and an upwardly extended upper end 85. The body has a shoulder 86 endwardly spaced from the sleeve and a washer 87 is positioned between the sleeve and such shoulder. The body 83, however, differs from the body 18 in the provision of an internal annular recess 88 adjacent to the lower end thereof.

An elongated resiliently flexible fluid conducting tube 90 is utilized having a lower end 91 secured in any convenient fluid-tight manner in the coupling sleeve 82 and an upper end 92 upwardly extended through the body 83 like tube 40 and for the same purpose. The lower end of the tube 90, however, has a plurality of annular transverse accordion pleats 93 or corrugations located in the recess 88 of the body. The tube 90 and body 83 may be substituted for the tube 40 and body 18 in certain instances where greater ease of movement of the tube is desired as the body rotates. It will be evident that the pleats accommodate rotation of the body 18 with a minimum of stress on the tube and is desirable with certain materials employed in constructing the tubes. The corrugations are found to be an advantageous expedient for avoiding material fatigue.

Operation

The operation of the described embodiments of the present invention is believed to be readily apparent and is briefly summarized at this point. To precondition the sprinkler for operation, the nut 53 is loosened and the support bracket 46 elevationally adjusted so as to adjust the inclination of the nozzle 32 for a desired trajectory of fluid discharge. This tips the post 61 and thus the arms 67 and 69 so as to maintain the relationship between the nozzle 32 and the fluid deflecting member 68. The flexible tube 40, or 90, permits limited movement of the nozzle and nozzle mounting member 28 relative to the upper end portion 19 of the body. The washer 36 is fitted somewhat loosely between the upper end portion and the mounting member to accommodate such movement and in fact may readily be omitted entirely.

The water supply, not shown, is then turned on for delivery of water to the sprinkler 10 through the coupling sleeve 11 or 82, in a manner believed to be well understood. Water travels upwardly through the tube 40, or 90, and outwardly of the jet nozzle 32. Water issuing from the nozzle impinges against the fluid deflecting member 68 and the reaction of the water leaving the deflecting member urges the deflecting member laterally away from the nozzle. When the inertia of the deflecting member is expended, the spring 75 returns the deflecting member and the arms to their original positions. The arms strike the legs 59 of the arch member 58 and impart rotative movement to the body 18 or 83, around the coupling sleeve 11 or 82, as an axis. Each impact of the arms against the legs, of course, only drives the body an increment of its complete revolutionary travel. With the deflecting member once again in its original position, the water issuing from the jet again strikes the member and urges it away from fluid intercepting position. As is now believed understood, this action is repeated to effect complete and continued rotation of the body. This type of motivation is known as impact drive.

It will be evident from the foregoing that the tubes 40, or 90, conduct fluid from the coupling sleeve 11, or 82, to the nozzle 32. The tube obviates the need for fluid packing glands, gaskets, and the like and, because of its fluid-tight connection to the sleeve and to the nozzle, does not permit fluid to escape during its passage from the sleeve to the nozzle. Since there are no fluid packing members or gaskets, wear of parts through constant contact is reduced, deterioration through corrosion is lessened and replacement of parts and maintenance expenses of the sprinkler are minimized. In addition to the foregoing, the device enables adjustment of the trajectory of discharge of the nozzle without affecting its oscillatory step-by-step intermittent rotation or the fluid-tight character of the passage for delivering fluid to the nozzle. It will thus be apparent that the described sprinkler is highly effective for accomplishing its intended functions.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a rotary sprinkler, a tubular fluid coupling member adapted to be connected to a source of fluid, a hollow tubular body having a mounting end rotatably journalled on the coupling member for rotation around a predetermined axis and an end extended transversely outwardly of said axis of rotation, an elongated resiliently flexible and compressible tube extended within the body having an end secured in fluid-tight connection to the coupling member and an end adjacent to the extended end of the body, the tubular body having an inside diameter slightly greater than the outside diameter of the flexible tube and extended substantially coextensively of the tube so that the tube is enclosed and protected by the body, and a fluid nozzle rotatably mounted in the extended end of the body and secured in fluid-tight relation to the end of the tube adjacent to the extended end of the body whereby rotation of the body relative to the coupling member causes rotation of the nozzle in the body.

2. In impact driven, stepped progression, rotary fluid sprinkler, a substantially cylindrical coupling sleeve having an annular flange and adapted to be fixedly connected in upstanding position to a source of fluid, an elongated arcuate tubular body having an endwardly disposed substantially cylindrical bearing socket rotatably received on the sleeve and endwardly rested on the flange, and an end portion upwardly and laterally extended from the socket, a fluid nozzle having an annular boss rotatably received in the extended end of the body, an elongated resiliently flexible and compressible fluid conducting tube co-extensively extended and substantially entirely enclosed within the body having opposite ends respectively secured in circumferential fluid-tight relation within the coupling sleeve and in circumscribing circumferential engagement over the boss of the nozzle, a fluid deflecting member, means mounting the deflecting member on the body for movement between a fluid intercepting position in front of the nozzle and a position displaced therefrom, and means yieldably urging the deflecting member into said intercepting position.

3. A rotary sprinkler comprising an upwardly disposed fluid coupling sleeve adapted for connection to a source of fluid, an outer elongated tubular body having a substantially cylindrical bearing socket rotatably fitted over the coupling sleeve and an upwardly laterally inclined end extended from the socket, the body having an annular nozzle mounting member pivotally mounted on the inclined end of the body for elevational pivotal movement, means adjustably interconnecting the nozzle mounting member and the body for securing the mounting member in selected angularly adjusted positions relative to the inclined end of the body, a fluid nozzle rotatably fitted in the nozzle mounting member, and an inner flexible fluid conducting member co-extensively extended and substantially fully enclosed within the body having opposite ends respectively connected in fluid-tight relation to the coupling sleeve and to the nozzle, whereby the nozzle rotates in the body when the body rotates on the sleeve.

4. A rotary fluid sprinkler comprising an upright substantially cylindrical fluid coupling sleeve having a substantially horizontal annular flange, an elongated outer arcuate tubular body having a lower substantially cylindrical bearing rotatably journalled on the sleeve above the flange and an upper end upwardly outwardly extended from the bearing, the body having a substantially cylindrical nozzle mounting member pivotally connected to the upper end of the body for elevational pivotal movement, a fluid discharge nozzle rotatably fitted on the nozzle mounting member having an axial bore through which fluid is discharged from the nozzle, an elongated resiliently flexible fluid conducting tube co-extensively extended within the body having a lower end secured in fluid-tight relation within the coupling sleeve and an upper end secured in fluid-tight relation to the nozzle, an adjustment stud extended from the body in spaced substantially parallel relation to the pivot axis for the nozzle mounting member, a bracket having an extended portion integrally connected to the nozzle mounting member and an adjustment flange having a slot slidably fitted on the stud, and means releasably connected to the stud adjustably securing the bracket in selected positions thereby to adjust the inclination of the axis of the nozzle bore.

5. In a self-driven step-by-step rotary fluid sprinkler including an upstanding substantially cylindrical fluid conducting sleeve adapted to be connected to a source of fluid under pressure, an upwardly outwardly extended tubular body rotatably mounted on the sleeve for rotation around an erect axis, and having an upper open end, a jet nozzle rotatably fitted in the open end of the body, a fluid deflecting member, means mounting the deflecting member on the body for oscillatory movement between a fluid intercepting position endwardly spaced from the nozzle and a position laterally displaced therefrom, and means connected to the mounting means yieldably urging the deflecting member into said intercepting position; means for conducting fluid from the fluid conducting sleeve to the nozzle comprising an elongated resiliently flexible tube extended within the body and having opposite ends, and means securing the opposite ends of the tube in fluid-tight relation to the sleeve and to the nozzle, respectively.

6. In an impact driven, stepped progression, rotary fluid sprinkler, an upstanding substantially cylindrical fluid coupling member, an upwardly outwardly extended tubular member rotatably mounted on the coupling member having an upper end and an upper nozzle mounting member pivotally connected to said upper end for elevational pivotal movement, a jet nozzle rotatably fitted on the nozzle mounting member having a fluid discharge axis, an elongated resiliently flexible fluid conducting tube extended within the tubular member having opposite ends connected in fluid-tight relation to the coupling member and to the nozzle respectively, a support bracket having an end portion integrally connected to the nozzle mounting member and an extended end portion, means adjustably securing the extended end portion of the bracket to the tubular member to position the nozzle axis in selected angular inclinations, a fluid deflecting member, means mounting the fluid deflecting member on the support bracket for oscillating movement between a fluid intercepting position in front of the nozzle and a position displaced therefrom, and means connected to the fluid deflecting member yieldably urging it into said fluid intercepting position whereby rotation is imparted to the body incident to impingement of fluid against the fluid deflecting member.

7. In a rotary fluid sprinkler, a base member adapted for connection to a source of fluid under pressure having an upwardly disposed male sleeve providing an inner surface circumscribing a bore and an outer cylindrical bearing surface, a tubular body mounted on the base member and providing a downwardly disposed cylindrical socket rotatably engaging the outer surface of the sleeve for rotation of the body about a predetermined axis, the body having an extended end eccentric to said axis of rotation providing an annular bearing surface disposed in a plane normal to said tubular body at its extended end, a nozzle having an annular bearing surface rotatably seated against the bearing surface of the body member and providing a tubular nipple disposed within the extended end of the body member, and an elongated resiliently flexible and compressible tube positioned within the body member having a first end non-rotatably connected in fluid communication with the base member and a second end non-rotatably connected in fluid communication with the nipple of the nozzle, said first end of the tube being fitted within the sleeve and circumferentially secured in fluid sealing relation to said inner surface thereof, said second end being fitted over the nipple and circumferentially secured in fluid sealing relation thereto.

8. A rotary fluid sprinkler as defined by claim 7 in which the flexible tube holds the nozzle against the extended end of the body member with the bearing surfaces in rotational engagement.

9. A rotary fluid sprinkler comprising an upright fluid coupling sleeve, an elongated outer tubular body having a lower substantially cylindrical bearing rotatably journaled on the sleeve and an upper end upwardly outwardly extended from the bearing, the body having a nozzle mounting member pivotally connected to the upper end of the body for elevational pivotal movement, a fluid discharge nozzle rotatably fitted on the nozzle mounting member having an axial bore through which fluid is discharged from the nozzle, an elongated resiliently flexible fluid conducting tube co-extensively extended within the body having a lower end secured in fluid-tight relation within the coupling sleeve and an upper end secured in fluid-tight relation to the nozzle, a bracket having an extended portion integrally connected to the nozzle mounting member and an adjustment flange adjacent to the body, and means adjustably interconnecting the flange and the body for adjustably securing the bracket in selected positions thereby to adjust the inclination of the axis of the nozzle bore.

References Cited in the file of this patent

UNITED STATES PATENTS

| | | |
|---|---|---|
| 448,522 | Hoyt | Mar. 17, 1891 |
| 2,203,210 | Young | June 4, 1940 |
| 2,611,645 | Forman | Sept. 23, 1952 |

FOREIGN PATENTS

| | | |
|---|---|---|
| 637,341 | Germany | Oct. 26, 1936 |